Oct. 17, 1972     J. C. HEURTLEY     3,698,892
METHODS OF THERMOPLASTIC XEROGRAPHY
AND APPARATUS THEREFOR
Filed April 10, 1970     2 Sheets-Sheet 1

INVENTOR.
John Crampton Heurtley
BY
*Marn & Jangarathis*
ATTORNEYS

Oct. 17, 1972 J. C. HEURTLEY 3,698,892
METHODS OF THERMOPLASTIC XEROGRAPHY
AND APPARATUS THEREFOR
Filed April 10, 1970 2 Sheets-Sheet 2

INVENTOR.
John Crampton Heurtley
BY
*Marn & Jangarathis*
ATTORNEYS

3,698,892
METHODS OF THERMOPLASTIC XEROGRAPHY AND APPARATUS THEREFOR
John Crampton Heurtley, Webster, N.Y., assignor to Xerox Corporation, Rochester, N.Y.
Filed Apr. 10, 1970, Ser. No. 27,310
Int. Cl. B41m 5/20; G03g 13/22
U.S. Cl. 96—1.1                                   25 Claims

ABSTRACT OF THE DISCLOSURE

Methods of thermoplastic xerography and apparatus therefor are provided in accordance with the teachings of the present invention wherein an electric field applied during the development of a photoreceptor structure, which includes a thermoplastic layer, may be relied upon to tune the quasi resonant frequency exhibited by such thermoplastic layer to a desired value and/or to force the thermoplastic layer to deform in a regular periodic manner which is exposure related.

---

This invention relates to thermoplastic xerography and more particularly to novel electrostatic methods and apparatus for forming a viewable pattern on a thermoplastic medium.

In the early stages of thermoplastic recording technology, a thermoplastic medium in the form of a layer of thermoplastic material was selectively charged in a vacuum by a cathode ray tube and thereafter softened by the application of heat or solvents thereto so that such thermoplastic layer would deform in response to the charges deposited thereon. When the thermoplastic medium returned to its hardened or solid state, the deformations caused by the selective charging were permanently stored thereon but could be erased by a second application of heat or solvents thereto. As the thermoplastic layer thus used manifested substantial storage density and could be optically read out, thermoplastic recording technology appeared to offer a promising new mode of data recordation. However, although the techniques employed appeared to be promising in the area of data storage, such techniques required expensive and complex equipment for both writing and readout and were not capable of producing an image having continuous tone such as would be necessary for document reproduction or the like.

As thermoplastic recording techniques advanced, it was discovered that the selective application of charge to the thermoplastic layer could be accomplished without the use of a cathode ray tube to selectively deposit charge in a vacuum by the adoption of certain xerographic, electrostatic charge deposition techniques. For instance, it was found that if the thermoplastic layer was overcoated on a photoconductive layer, such as that used in xerographic processes, the selective charge deposition on the thermoplastic layer could be accomplished by uniformly charging such overcoated thermoplastic layer and thereafter exposing the photoconductive layer to a light and dark pattern representative of the charge deposition desired. This technique as well as other well known xerographic techniques by which a latent image was formed on the thermoplastic medium completely avoided the need for vacuum charging, the onerous system limitations caused thereby and the cathode ray tube charging apparatus previously required. The deformation patterns thereby obtained on the thermoplastic layer after the same was developed by heating or exposure to solvents or the vapors thereof were of a nature such that a ridge-like deformation would occur at areas of sharp difference in the charge density of the applied charge pattern whereby the overall response of the thermoplastic layer or the deformation pattern obtained was related to the differences in the charge density of adjacent areas rather than the absolute charge density of each portion of the thermoplastic layer. This type of deformation pattern has been denominated a "relief" image because each deformation formed on the thermoplastic layer results from viscous flow which takes place between areas of substantial charge density difference due to differential fluid pressure in the thermoplastic layer below the charges and the lateral component of the electric vector on the charges at the boundary between each of such areas. Relief images are characterized by ridge-like deformations which take place for the most part only at the edges of the charge area and hence although relief imaging systems are suited for the reproduction of high contrast objects such as line copy or the like, no continuous tone reproductions are obtainable therewith. Exemplary of thermoplastic recording systems which produce relief images are U.S. Pat. No. 3,113,179 to Glenn, Jr.; U.S. Pat. No. 3,095,324 to Casano et al.; U.S. Pat. No. 3,063,872 to Baldebuck; U.S. Pat. No. 3,055,006 to Dreyfoos, Jr. et al. and U.S. Pat. No. 2,985,866 to Norton.

Additionally, it has been found that if the thickness of the layer of thermoplastic material overcoated on the photoconductive layer to thereby form the responsive portion of a photoreceptor for a thermoplastic recordation system is maintained within a certain range, the nature of the deformation pattern obtained will be markedly different from that associated with a relief image. This form of deformation pattern has been termed frost deformation because the surface folds or wrinkles obtained on the surface of the thermoplastic layer appear similar to a frosted piece of glass. Frost imaging is highly advantageous because the deformation patterns obtained therewith are not only suitable for the production of line copy images as are relief imaging systems, but in contradistinction thereto, frost images exhibit inherent solid area coverage, continuous tone response and may be viewed directly or displayed by simplified reflection or transmission optical systems. Therefore, frost imaging systems are uniquely suited for data recordation as well as copying functions generally relegated to xerographic or photographic reproduction apparatus; however, unlike these forms of reproduction apparatus, frost imaging systems do not require the application of a particle carrying developer thereto.

Frost imaging systems generally rely upon a photoreceptor which includes a photoconductive layer, which may take the form of a xerographic plate, having a thin layer or film of thermoplastic material overcoated thereon. The thickness of the thermoplastic layer is usually in the range of $1\mu$–$6\mu$; however, a range of $0.5\mu$–$40\mu$ is generally considered available. The typical processing steps applied to this photoreceptor generally involve a charging step, at least one exposure step, a second charging step and a development step wherein the thermoplastic layer or film is heated or exposed to solvents or their vapors and allowed to deform. The frost images formed thereby may then be viewed directly, due to the surface scattering of radiation exhibited thereby, or displayed by simple optical reflection or transmission techniques. The phenomena of frost deformation is considered to be related not only to the charge placed on the thin thermoplastic layer, as in the case of the relief image, but is also a function of the characteristics of the thin thermoplastic layer per se which exhibits hydrodynamic resonance. Exemplary frost imaging systems are considered in U.S. Pat. No. 3,196,011, to Gunther et al.; U.S. Pat. No. 3,196,008, to Mihajlov et al. and the article by R. W. Gundlach and C. J. Claus entitled "A Cyclic Xerographic Method Based On Frost Deformation," Phot. Sci. and Eng. 7, 1, pps. 14–19, 1963.

As frost deformation is highly dependent on the characteristics of the thin thermoplastic layer, as is to a limited extent relief deformation, thermoplastic recording systems have been plagued with the problem of the uniform initiation of the deformation of the surface of the thermoplastic layer and the distortion problems attendant thereto. If frost deformation is considered, this problem may be appreciated by the realization that upon the development of the thermoplastic layer of a photoreceptor which has been charged, exposed to a light and dark pattern and thereafter charged again, in accordance with conventional frost recording techniques; wherever an overlap between the spatial spectrum of the incident radiation crosses the resonance points of the thermoplastic layer, i.e., the points on the surface of the thermoplastic layer corresponding to the quasi resonance points, surface perturbations associated with frost deformation will initially occur and such surface perturbations will manifest a growth rate which substantially exceeds the growth rates of surface perturbations associated with portions of the surface of the thermoplastic layer which do not correspond to such quasi resonance points and would normally frost subsequent thereto. Thus, under these conditions, the portions of the surface of the thermoplastic layer which frost first and exhibit large growth rates will distort, due to their excessive growth rates, other surface portions of the thermoplastic layer and hence the subsequent frosting thereof will not occur in a random manner. Therefore, unless the spatial spectrum of the input radiation applied to the photoreceptor is limited so as not to cross the quasi resonance points of the thermoplastic layer, the nonuniform initiation of surface perturbations together with the nonuniform growth rates attending the formation of initial surface perturbations will result in a distortion of the input information and hence, the frost deformation pattern formed will be noisy and not truly representative of the information sought to be stored.

One solution to the foregoing problem is to design the thermoplastic layer to have a high resonant frequency and to modulate the input information or input radiation applied to the photoreceptor during the exposure step in a manner such that the variation of the carrier relied upon for such modulation corresponds to the quasi resonant frequency of the thermoplastic layer. The design technique directed to forming a thermoplastic layer having a high quasi resonant frequency constitutes an effort to achieve a thermoplastic layer whose quasi resonant frequency is sufficiently high so that activating radiation having a spatial spectrum residing below the quasi resonant frequency of the thermoplastic layer may be selected for application thereto during the exposure step whereupon nonuniform frost initiation at the quasi resonant frequency of the thermoplastic layer may be avoided. The design of a thermoplastic layer having a high quasi resonant frequency may be accomplished by the selection of an appropriate thickness for such thermoplastic layer because the quasi resonant frequency exhibited by a thermoplastic layer is directly related to thickness in a manner such that the thinner the thermoplastic layer, the higher the quasi resonant frequency exhibited thereby. However, this design technique is limited and hence insufficient by itself to overcome the problems associated with nonuniform surface perturbation initiation because thermoplastic layers which are too thin are somewhat unpredictable in their ability to hold a charge, there is a lower limit of thickness beyond which viewable frost deformation patterns will not occur and there are substantial manufacturing difficulties associated with the production of extremely thin thermoplastic layers. Thus, thermoplastic layers which are too thin are impractical.

The modulation of the input exposure in accordance with the second aspect of this solution is accomplished by the application of the input radiation to the surface of the thermoplastic layer through a spatial grating such as a screen or grid having a sinusoidal transmission characteristic whose transmission frequency corresponds to the quasi resonant frequency of the thermoplastic layer. This is done by selecting a screen or grid wherein the distance between the average exposure points thereon is related to the quasi resonant frequency of the thermoplastic layer. In this manner, the problem of uniform perturbation initiation is substantially avoided because the surface of the thermoplastic layer is forced to deform in a regular sinusoidal manner, the local amplitude of which is exposure related. However, as it is often difficult and costly to practically achieve large area modulating screens or grids exhibiting appropriate surface area coverage for the surface of an actual photoreceptor to be exposed, the practice of screened thermoplastic xerography techniques often present a number of substantial practical problems.

A second solution to the problems associated with nonuniform initiation of frost on a thermoplastic layer of a photoreceptor used in a thermoplastic xerography system is to prevent such thermoplastic layer from frosting in a random mode by pre-disposing the thermoplastic layer to frost in a regular periodic manner. This solution employs the various organized thermoplastic xerography techniques disclosed application Ser. No. 73,317, filed on Sept. 18, 1970 and copending herewith. Although the aforesaid copending application should be consulted for the detailed methods and photoreceptor structures disclosed therein, organized thermoplastic xerography briefly involves the formation of a regular periodic physical deformation in the photoreceptor structures used therein at the interface between the thermoplastic and photoconductive layers of such photoreceptor structure so that upon the charging, exposure and development of such thermoplastic layer, the surface of the thermoplastic layer will deform in the frost mode to form a viewable pattern which is exposure related and everywhere periodic. As it is desirable that the regular periodic physical deformation established in photoreceptor structures used for the practice of organized thermoplastic xerography techniques exhibit a periodicity which is similar to that manifested by the quasi resonant frequency of the thermoplastic layer and a high quasi resonant frequency is generally a desirable characteristic of a thermoplastic layer used in any frost recordation technique; it will be appreciated that practical difficulties often arise in establishing a regular periodic physical deformation at the interface between the thermoplastic and photoconductive layers in a photoreceptor structure which exhibits a desired correspondence in periodicity with the quasi resonant frequency of the thermoplastic layer. Thus, in photoreceptor structure for use with organized thermoplastic xerography techniques, a mechanism for matching the periodicity of the quasi resonant frequency exhibited by a thermoplastic layer to that manifested by a physical configuration would also be desirable.

The instant invention proceeds upon a recognition of the theoretically predicted and experimentally demonstrated principle that both the rate and frequency response of a charged thermoplastic layer or any liquid dielectric undergoing deformation may be made a function of an externally applied field and hence the application of such principle will enable the quasi resonant frequency of a thermoplastic layer to be tuned to a desired value and/or such thermoplastic layer may be forced to deform in a regular periodic manner by the application of an appropriate external field thereto.

Therefore, it is an object of this invention to provide electrostatic methods and apparatus for tuning the quasi resonant frequency exhibited by a thermoplastic layer of a photoreceptor structure to a desired value.

It is a further object of this invention to provide a method of thermoplastic xerography and the apparatus therefor wherein the thermoplastic layer of a photoreceptor structure is forced to deform in a regular periodic manner upon the development thereof by the application of an externally applied electric field thereto.

It is another object of this invention to provide a method of thermoplastic xerography and the apparatus therefor wherein the application of a uniform electric field to a photoreceptor structure during the development thereof may be relied upon to increase the speed of development while the characteristic size of the frost deformations formed are decreased.

It is an additional object of this invention to provide a method of thermoplastic xerography and the apparatus therefor wherein a photoreceptor structure including a thermoplastic layer may be forced to exhibit a quasi resonant frequency which would normally be associated with a substantially thinner thermoplastic layer while the usual charge retention characteristics of such thermoplastic layer are maintained.

Other objects of the present invention will become apparent from the detailed description of several exemplary embodiments thereof which follow and the novel features of the present invention will be particularly pointed out in conjunction with the claims appended hereto.

In accordance with the teachings of the present invention thermoplastic xerography methods and the apparatus therefor are provided wherein a photoreceptor including a thermoplastic layer is developed in the presence of an electric field and depending upon the characteristic of such electric field the quasi resonant frequency exhibited by such thermoplastic layer may be tuned to a desired value and/or such thermoplastic layer may be forced to deform in a regular periodic manner which is exposure related. The invention will be more clearly understood by reference to the following detailed description of several exemplary embodiments thereof in conjunction with the accompanying drawings in which:

Referring now to the drawings and more particularly to FIGS. 1A–1D thereof, there is shown an exemplary embodiment of the present invention wherein screened thermoplastic xerography techniques are employed to form a viewable pattern on the thermoplastic layer of a photoreceptor structure and said thermoplastic layer is forced to exhibit a desired quasi resonant frequency during the development thereof. The photoreceptor structure 1 shown in FIGS. 1A–1D is illustrated as comprising a conventional three (3) layer structure which includes a substrate 2, a photoconductive layer 4 and a thermoplastic layer 6; however, as will be obvious to those of ordinary skill in the art, other conventional forms of photoreceptor structure may be readily employed according to the teachings of the present invention. The substrate 2 may take the form of any supporting medium such as metal, glass or plastic which is capable of supporting the remaining portions of the photoreceptor structure in a relatively rigid form regardless of whether the thermoplastic layer 6 is in a solid or liquid state. The substrate 2 may exhibit either dielectric or conductive electrical characteristics depending upon the characteristics of the material chosen, it being understood that it is desirable to have a conductive medium in electrical contact with the lower surface of the photoconductive layer 4 and hence should dielectric material be selected a thin layer of metallic film may be coated on the upper surface of substrate 2 so as to be in contact with photoconductive layer 4. Additionally, the physical properties of the substrate 2 should be such that said substrate 2 maintains the same relative rigidity when the thermoplastic layer 6 is heated, treated by solvents or solvent vapors while being sufficiently flexible at all times so as to enable the resulting photoreceptor structure to be used, when desired, in the form of webs or tapes suitable for the application of winding and reeling techniques thereto. It should further be noted that the substrate 2 may be formed of transparent material should it be desired to expose, in the manner described below, the photoconductive layer 4 to activating radiation from the substrate 2 side of the photoreceptor structure rather than the side of the thermoplastic layer 4 as shown in FIGS. 1A–1D and described subsequently.

The photoconductive layer 4 may comprise any of the well known class of insulating materials which are rendered conductive upon the application of radiation thereto. For instance, the photoconductive layer 4 may comprise photoconductive insulating materials such as amorphous selenium, alloys of sulfur, arsenic or tellurium with selenium, selenium doped with materials such as thallium, cadmium sulfide, cadmium selenide, etc., particulate photoconductive materials such as zinc sulfide, zinc cadmium sulfide, French process zinc oxide, phthalocyanine, cadmium sulfide, cadmium selenide, zinc silicate, cadmium sulfoselenide, linear quinacridones, etc. dispersed in an insulating inorganic film forming binder such as a glass or an insulating organic film forming binder such as an epoxy resin, a silicone resin, an alkyd resin, a styrene-butadiene resin, a wax or the like. Other typical photoconductive insulating materials include: blends, copolymers, terpolymers, etc. of photoconductors and non-photoconductive materials which are either copolymerizable or miscible together to form solid solutions and organic photoconductive materials of this type include: anthracene, polyvinylanthracene, anthraquinone, oxidiazole derivatives such a 2,5-bis(p-amino-phenyl)1,3,4-oxadiazole; 2-phenylbenzoxazole; and charge transfer complexes made by complexing resins such as polyvinyl carbazole, phenolaldehydes, epoxies, phenoxies, polycarbonates, etc. with Lewis acids such as phthalic anhydride; 2,4,7-trinitrofluorenone; metallic chlorides such as aluminum, zinc or ferric chloride; 4,4-bis(dimethylamino) benzophenone; chloranil, picric acid; 1,3,5-trinitrobenzene; 1-chloroanthraquinone; bromal; 4-nitrobenzaldehyde; 4-nitrophenol; acetic anhydride; maleic anhydride; boron trichloride; maleic acid, cinnamic acid; benzoic acid; tartaric acid; malonic acid and mixtures thereof. The photoconductive layer 4 may be made either transparent or radiation absorbing in nature by the choice of the photoconductive insulating material selected. The photoconductive layer 4 like most photoconductive layers relied upon in conventional xerographic apparatus, should exhibit electrical characteristics such that it is highly insulating in the absence of input or activating radiation applied thereto while manifesting excellent vertical conductivity and low lateral conductivity upon the exposure thereof to activating radiation. However, as shall be seen below, low lateral conductivity is not of paramount importance because the thermoplastic xerography techniques employed herein may be practiced in a manner to attenuate the critical role played by the lateral conductivity of the photoconductive layer 4 in the resolution of the frost image formed. The thickness of the photoconductive layer 4 should be appropriate for the formation and selective dissipation of charge patterns of the requisite magnitudes so that high resolution frost images may be formed. Although in FIGS. 1A–1D the photoreceptor structure 1 has been illustrated as comprising independent photoconductive and thermoplastic layers 4 and 6, respectively, it will be apparent to those of ordinary skill in the art that as an alternative thereto, the photoconductive and thermoplastic layers may be combined by suitably dispersing photoconductive material within the thermoplastic layer 6.

The thermoplastic layer 6 may comprise any thermoplastic material overcoated on the surface of the photoconductive layer 4 having a thickness which is appropriate so that hydrodynamic resonance plays a key role in the frost deformation which takes place at the surface thereof. The thermoplastic layer 6 may be formed of any material which deforms in the frost mode in accordance with the charge pattern thereon upon the application of heat, solvents and/or solvent vapors thereto. Typical examples of suitable thermoplastic materials include those set forth in Table I below as follows:

TABLE I

| Trademark | Chemical Type | Manufacturer |
|---|---|---|
| 1 Piccotex | Styrene | Pennsylvania Industrial Chemical Corp. |
| 2 Piccolyte | Terpene resin | Do. |
| 3 Staybelite 5 | Rosin ester | Hercules Powder Co. |
| 4 Staybelite 10 | do | Do. |
| 5 Piccoumaron | Coumarone | Pennsylvania Industrial Chemical Corp. |
| 6 Piccolastic D150 | Styrene | Do. |
| 7 Piccoflex 100A | Polyvinyl chloride | Do. |
| 8 Velsicol X-37 | Copolymer resin | Velsicol Chemical Corp. |
| 9 Neville R13 | Coumarone indene | Neville Chemical Co. |
| 10 Nevillac soft | Phenol modified coumarone indene. | Do. |
| 11 Piccolastic E125 | Styrene | Pennsylvania Industrial Chemical Corp. |
| 12 Piccolastic D125 | do | Do. |
| 13 Picco 75 | Indene | Do. |
| 14 Piccopale 70 | Hydrocarbon (unsaturated). | Do. |
| 15 Piccolastic A-50 | Styrene | Do. |
| 16 Piccolastic A-75 | do | Do. |

However, such thermoplastic materials as are set forth in Table I, should be considered as exemplary only, rather than limiting, because the type of material chosen forms no part of the instant invention per se and hence, alternative materials may be readily substituted by those of ordinary skill in the art. The thickness of the thermoplastic layer 6 may vary over a wide range so long as the overcoated material deforms in the frost mode and hydrodynamic resonance plays a key role in such deformation. As a preferred range, the thickness of thermoplastic layer 6 may reside between $1\mu$ and $6\mu$; however, a range from $0.5\mu$–$40\mu$ is considered to be available. Furthermore, it should be noted that although the preferred range set forth will yield a thermoplastic layer 6 which exhibits a relatively high quasi resonant frequency $\omega_R$ since, as aforesaid, the thinner the thermoplastic layer 6 the higher the quasi resonant frequency manifested thereby; a thermoplastic layer 6 exhibiting a quasi resonant frequency $\omega_R$ which is higher than the spatial spectrum of the activating radiation received thereby is not a requirement of the instant invention. Accordingly, although the thickness of the thermoplastic layer 6 should be such that it manifests a relatively high quasi resonant frequency $\omega_R$, as such quasi resonant frequency need not be higher than the spatial spectrum of the activating radiation received by the photoreceptor structure 1; the thickness of the thermoplastic layer 6 should be selected so that it is sufficiently thick to exhibit good charge retention characteristics, may be conveniently formed by conventional techniques, and should not closely approach the lower limit, as aforesaid, at which a viewable frost deformation pattern will occur. The thermoplastic layer 6 may be overcoated on the surface of the photoconductive layer 4 by any suitable deposition technique conventionally employed by those of ordinary skill in the art. For instance, convenient coating techniques which may be readily employed for overcoating the thermoplastic layer 6 onto the photoconductive layer 4 are set forth in Canadian Pats. 568,707 and 611,852 to Neugebauer et al.

The exemplary photoreceptor structure 1 described above may have a viewable frost deformation pattern formed on the surface of the thermoplastic layer 6 thereof by the exemplary screened thermoplastic xerography techniques illustrated in FIGS. 1A–1D; however, as will be manifest to those of ordinary skill in the art from the explanation of the instant invention which is set forth hereinafter, the process steps depicted in FIGS. 1A–1D indicate only one possible embodiment of the present invention intended to acquaint the reader with the concept involved. Briefly, the screened thermoplastic xerography technique illustrated in FIGS. 1A–1D contemplates the steps of initially applying a uniform charge to the upper surface of the photoreceptor structure so that such uniform charge is distributed on the surface of the thermoplastic layer 6, selectively exposing said photoreceptor structure 1 through a spatial grating to a light and dark pattern so that the photoconductive layer 4 is selectively rendered conductive whereupon selective charge dissipation occurs, optionally recharging the surface of said photoreceptor structure 1 to a constant potential and developing such photoreceptor structure 1 in the presence of a uniform electric field by the application of heat, solvents or solvent vapors thereo whereby a frost deformation pattern is established at the upper thermoplastic surface of the photoreceptor structure 1 which corresponds to the light and dark pattern through which selective exposure took place and exhibits a periodicity determined by said spatial grating. Furthermore, the development of said photoreceptor structure 1 may be optionally accomplished in light (not shown) to reduce the effects of any lateral conductivity exhibited by the photoconductive layer 4 and alleviate any infrared radiation difficulties related to heating the surface thereof in a dark environment.

Figure 1A:
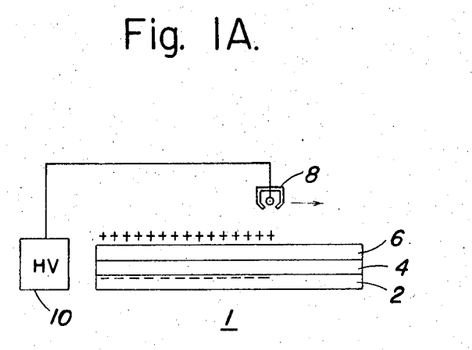
FIGS. 1A–1D illustrate an exemplary embodiment of the present invention wherein screened thermoplastic xerography techniques are employed to form a viewable pattern on a thermoplastic layer and said thermoplastic layer is forced to exhibit a desired quasi resonant frequency during the development thereof.

The initial step of the exemplary screened thermoplastic xerography technique illustrated in FIGS. 1A–1D is shown in FIG. 1A, wherein a uniform charge is applied to the photoreceptor structure 1 previously described above. For the purposes of explanation, the substrate 2 may be considered to comprise a conductive material which is referenced to ground potential or alternatively, the substrate 2 may be considered to be nonconductive in which case a thin grounded metallic conductive layer (not shown) may be present at the interface between the substrate 2 and the photoconductive layer 4. However, as the lower surface of the photoconductive layer 4 need not of necessity be referenced to ground, this being merely a preferred mode of operation, charge indications complementary to those applied to the surface of the photoreceptor structure have been illustrated in appropriate association with the photoconductive layer 4 so that a nongrounded mode of operation is also generally shown and it will be clearly understood by those of ordinary skill in the art that such charge indications may be considered as the ground plane charge levels for the grounded case. As shown in FIG. 1A, a uniform charge as indicated by positive charge indicia, is applied to the upper surface of the photoreceptor structure 1. This uniform charge may be either positive, as indicated in FIG. 1A, or negative and may be applied in any manner well known to those of ordinary skill in the art. The technique for applying the initial uniform charge to the upper surface of the thermoplastic layer 6 which is illustrated in FIG. 1A may be considered to be a corona charging technique such as that described in U.S. Pats. 2,836,725 and 2,777,957 to Vyverberg and Walkup, respectively, wherein a specialized electrode means 8 is supplied by a source of high potential 10 and is capable of applying a uniform charge to the upper surface of the thermoplastic layer 6 when said specialized electrode means 10 is passed over the surface thereof one or more times. The corona charging techniques set forth in the Vyverberg and Walkup patents are highly convenient for applying a uniform charge to the upper surface of the thermoplastic layer 6 because a uniform charge level which is substantial in magnitude and is either positive or negative in polarity may be quickly and easily established. However, although specific corona charging techniques have here been mentioned as suitable for applying a uniform charge to the upper surface of the thermoplastic layer 6, it should be noted that other charging techniques such as those employing radioactive sources or other corona charging techniques may be relied upon as the precise manner in which the uniform charge is established on the surface of the photoreceptor structure forms no part of the present invention per se. As the uniform charge indicated by the positive sign indicia + in FIG. 1A are applied to the surface of the thermoplastic layer 6, the photoreceptor structure 1 will have complementary, opposite polarity charges induced therein at the interface between the photoconductive layer 4 and the conductive material, i.e., the metal film or the substrate 2, in the well known manner. Since the photoconductive layer 4 is, under the conditions specified heretofore, in its insulating state, the opposite polarity charges thereby induced at the underside of the photoconductive layer 4 will not be further conveyed toward the thermoplastic layer 6 and accordingly, the charge pattern associated with the photoreceptor structure 1 will manifest a uniform potential and may be considered to approach that illustrated in FIG. 1A by the positive (+) and negative (—) charge indicia.

Figure 1B:
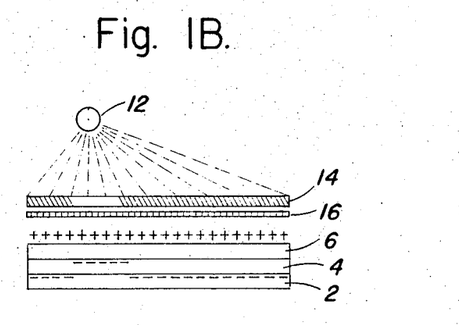

Upon the completion of the initial charging operation wherein the charge pattern shown in FIG. 1A is formed, the second step of the screened thermoplastic xerography technique now under consideration may take place in the manner described in conjunction with FIG. 1B. The second step of the exemplary screened thermoplastic xerography technique illustrated in FIGS. 1A–1D comprises the selective exposure of the depicted photoreceptor structure to activating radiation through a spatial grating so that the photoconductive layer 4 is rendered selectively conductive. This may be accomplished, as indicated in FIG. 1B by imaging activating radiation from a source 12 onto the upper surface of the thermoplastic layer 6, through a light and dark pattern 14 representing the object to be reproduced and a spatial grating 16. As the thermoplastic layer 6 is transmissive to radiation impingent thereon, modulated activating radiation will propagate through the thermoplastic layer 6 and be received at the surface of the photoconductive layer 4. The nature of the modulated activating radiation is such that the carrier component periodicity thereof is determined by the spatial grating 16 as discussed in greater detail below, and the information content thereof is governed by the light and dark pattern 14. Therefore, activating radiation having a predetermined, periodic distribution is selectively applied to discrete surface portions of the photoconductive layer 4 which spatially correspond to the light portions of such light and dark pattern 14. The corresponding portions of the photoconductive layer 4 are thereby selectively rendered conductive in the periodic manner dictated by the activating radiation from spatial grating 16 received thereby so that the charge pattern residing at the interface between the photoconductive layer 4 and the conductive material will be altered in the manner shown in FIG. 1B wherein the charges residing at such discrete, activated portions of the photoconductive layer 4 will propagate therethrough to the lower surface of the thermoplastic layer 6 which is insulating in nature. The uniform charge pattern on the surface of the thermoplastic layer 6 is thereby selectively dissipated to the extent that the surface of the photoreceptor structure 1 no longer exhibits the same potential at the surface portions thereof overlying the activated portions of the photoconductive layer 4 as it does at the portions thereof which do not overlie the discrete portions of the photoconductive layer 4 which have been activated. Thus, in the second step of the screened thermoplastic xerographic technique according to the present invention, the charge pattern illustrated in FIG. 1B is established due to the selective and periodic exposure of the photoreceptor structure 1 to activating radiation from the source 12.

The source 12 may comprise any suitable form of radiation imaging means capable of generating radiation whose wavelength is appropriate for activating the photoconductive layer 4 and which may be selectively imaged through the light and dark pattern 14 and the spatial grating 16. Thus, assuming the availability of materials having the requisite characteristics for the formation of a suitable light and dark pattern 14, a spatial grating 16 and an appropriately responsive photoconductive layer 4; the source 12 may generate radiation having any selected range of wavelengths in the spectrum from infrared to X-rays. Practically, the source 12 may generate any actinic group of wavelengths or a source of X-rays may alternatively be used. The light and dark pattern 14 illustrated in FIG. 1B has been depicted as comprising a solid member having a singular light transmissive portion therein so that the mode of selective exposure of the photoconductive layer 4 and the resulting charge pattern formation attending such exposure may be simply illustrated and explained. However, as will be obvious to those of ordinary skill in the art, the light and dark pattern 14 shown in FIG. 1B may practically comprise any form of data records presently capable of reproduction by xerographic or photographic techniques. For instance, the light and dark pattern 14 may comprise a photographically formed negative or positive transparency or any other form of data record capable of selective radiation transmission so that an information component is imparted to the radiation propagating therethrough. Alternatively, the light and dark pattern 14 may comprise an opaque surface having data indicia present thereon; however, when these conditions obtain, as will be obvious to those of ordinary skill in the art, the source of radiation 12 will be repositioned so that the photoreceptor structure 1 depicted in FIG. 1B is selectively exposed using conventional radiation reflection techniques rather than the transmission techniques employed in conjunction with FIG. 1B.

The spatial grating 16 may take the conventional form of a screen or grid whose filament spacing is appropriate to impart a spatial distribution which approaches the function $O_E(x)[\frac{1}{2}(1+\cos \omega_r x)]$ to radiation propagating therethrough, where $O_E(x)$ is the intensity of the input exposure and $\omega_r$ is equal to the distance between the average exposure points on the screen or grid. The well known function of the spatial grating 16, which takes on certain aspects of filtering, is to apply a sinusoidal distribution to activating radiation which propagates therethrough so that such activating radiation is sinusoidally modulated in a fixed periodic manner which may be likened to the carrier component of a modulated waveform. Therefore, upon receipt of such sinusoidally modulated activating radiation, the photoconductive layer 4 will be rendered selectively conductive in a periodic manner (not indicated by the charge indicia in FIG. 1B) which is directly related to the sinusoidal modulation imparted to such activating radiation by the spatial grating 16. As the activating radiation received by the photoconductive layer 4 propagates through the light and dark pattern 14 and the spatial grating 16, it will be appreciated that the photoconductive layer 4 not only receives periodically modulated activating radiation from the spatial grating 16 but that such activating radiation also comprises an information related component which derives from the selective transmission qualities of the light and dark pattern 14. Thus, it will be seen that if the modulation imparted by the spatial grating 16 is likened to the carrier component of a modulated waveform and the modulation imparted by the light and dark pattern 14 is likened to the information component of a modulated waveform, the modulated activating radiation received by the photoconductive layer 4 will render such photoconductive layer selectively conductive in a periodic manner, as dicated by the spatial grating 16, which is exposure related due to the information content of the light and dark pattern 14 imparted thereto.

As shall be seen below, the purpose of the carrier modulation imparted to the activating radiation by the spatial grating 16 is to force the surface of the thermoplastic layer 6 to deform in a regular periodic manner and in this manner to avoid the pitfalls, as aforesaid, attendant to nonuniform frost initiation of a thermoplastic layer which is allowed to deform in the random mode. To successfully force said thermoplastic layer 6 to deform in a regular periodic manner by the application of sinusoidally modulated activating radiation thereto, it was previously considered necessary to have $\omega_r$ as present in the expression $\frac{1}{2}(1+\cos \omega_r x)$, used in determining the filament spacings of the spatial grating 16, closely approach the quasi resonant frequency $\omega_R$ of the thermoplastic layer 6 so that the regular periodic deformation of the thermoplastic layer 6 would be aided by hydrodynamic resonance. However, as shall be seen below, the quasi resonant frequency $\omega_R$ of the thermoplastic layer 6 may be tuned during the development step of the instant thermoplastic xerography technique to a desired value which may be equal to the value $\omega_r$ used in the design of the spatial grating 16. Therefore, the value of $\omega_r$ used in the design of the spatial grating 16 need not closely approach the quasi resonant frequency $\omega_R$ of the thermoplastic layer 6, in fact, a deliberate mismatch therebetween may be selected under conditions where the quasi resonant frequency $\omega_R$ of the thermoplastic layer 6 was selected at a lower value than would be otherwise optimum so that such thermoplastic layer 6 might be more conveniently formed or high charge retention characteristics could be manifested thereby.

In FIG. 1B, it will be noted that radiation emanating from source 12 propagates through the light and dark pattern 14 prior to being optically screened by the spatial grating 16; however, as will be obvious to those of ordinary skill in the art the relative positions of the light and dark pattern 14 and the spatial grating 16 could be interchanged with respect to the source 12 without optically changing the manner in which the selective exposure step illustrated in FIG. 1B is carried out. Thus, it is seen that according to the second step of the screened thermoplastic technique depicted in FIG. 1B, the charge pattern established in the photoreceptor structure 1 is selectively altered so that the potential present at the surface thereof is no longer uniform. Additionally, although the steps of the screened thermoplastic xerography technique described in conjunction with FIGS. 1A and 1B have been set forth in a sequential mode of operation, it will be appreciated by those of ordinary skill in the art that such steps may be combined so as to be performed simultaneously.

Figure 1C:
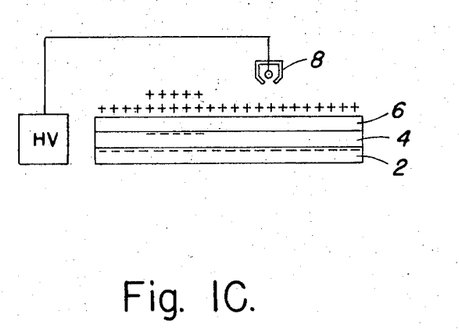

The third step of the exemplary screened thermoplastic xerography technique illustrated in FIGS. 1A-1D comprises, as shown in FIG. 1C, a second charging step wherein the surface of the photoreceptor structure 1 is again charged to a constant potential with respect to ground, or the reference potential associated with the conductive material in contact with the lower surface of photoconductive layer 4. This may be accomplished in the same manner as was described in conjuction with FIG. 1A wherein the specialized electrode 8 of a corona charging device is passed over the surface of the photoreceptor structure 1 so that a charge is again uniformly applied thereto in a manner which tends to bring the surface to a uniform potential whose value is determined by the voltage of the specialized electrode 8. As the portions of the thermoplastic layer 6 overlying the portions of the photoconductive layer 4 which did not receive activating radiation in the selective exposure step depicted in FIG. 1B remain at the same potential as was present after the initial charging operation depicted in FIG. 1A, these portions will not receive additional charge as the charge level thereat is already sufficient to manifest the potential which the second charging operation seeks to impose. Thus, in FIG. 1C, the portions of the overcoated thermoplastic layer 6 which overlie portions of the photoconductive layer 4 which did not receive activating radiation have been depicted with the same number of charge representing indicia as were utilized for such portions in FIGS. 1A and 1B. In contradistinction thereto, the portions of the thermoplastic layer 6 overlying the portions of the photoconductive layer 4 which have received activating radiation have had the potential level associated therewith reduced by the selective exposure step depicted in FIG. 1B. Accordingly, such portions of the overcoated thermoplastic layer 6 which overlie portions of the photoconductive layer 4 which were rendered conductive during the selective exposure step illustrated in FIG. 1B will receive additional charge during the recharging step illustrated in FIG. 1C so that the potential level associated therewith becomes equal to that associated with the remainder of the upper surface of the thermoplastic layer 6. This condition is illustrated in FIG. 1C by the second, partial row of charge representing indicia associated with the portions of the thermoplastic layer 6 overlying the portions of the photoconductive layer 4 which received activating radiation during the selective exposure step illustrated in FIG. 1B. Therefore, as may be appreciated from an inspection of FIG. 1C, the second charging operation acts to establish each portion of the surface of the thermoplastic layer 6 at the same potential with respect to ground or another reference potential associated therewith. However, although the surface of the thermoplastic layer 6 has been rendered an equipotential surface with respect to ground by the second charging operation depicted in FIG. 1C, it will be apparent that the surface charge density of the photoreceptor structure now varies in proportion to its capacitance with respect to ground or the reference potential associated with the conductive material in contact with the lower surface of the photoconductive layer 4 and such capacitance has been substantially increased in the portions of the photoreceptor structure vertically associated with the portions of the photoconductive layer 4 which were selectively exposed teo activating radiation. Thus, at the termination of the third step of the screened thermoplastic xerography technique shown in FIGS. 1A-1D, the charge density present at the surface of the thermoplastic layer 6 various in accordance with the light and dark pattern 14 through which the photoreceptor structure 1 was selectively exposed and has a sinusoidal periodicity, at the portions thereof which receive activating radiation, which is determined by the spatial distribution associated with the spatial grating 16.

As thermoplastic layer 6 is sufficiently thin so that hydrodynamic resonance plays a key role in the deformation thereof when such surface is developed by the application of heat, solvents or solvent vapors thereto; a thermoplastic layer 6 having a charge pattern present thereon such as that shown in FIG. 1C will deform in the frost mode such that very minute scattered depressions will be formed over the entire surface thereof, in accordance with the density of the charge pattern thereon, whereby the surface will take on the appearance of a piece of frosted glass. Where the charge density of the charge pattern present on the surface is substantial, i.e., those areas overlying selectively exposed portions of the photoconductive layer 4, the frost density will be substantial while those portions of the surface of the thermoplastic layer 6 where the charge density is less, due to their association with the unexposed portions of the photoconductive layer 4, will frost to a substantially lesser degree. In the absence of the screened frost techniques employed by the instant embodiment of the present invention, or the organized frost techniques employed in application Ser. No. 73,317, upon the development of such a thermoplastic layer, the frost deformation pattern would generally develop in a manner which would appear random in character except that frost deformations will not be uniformly initiated and the surface perturbations associated therewith would not exhibit uniform growth rates. These characteristics of frost in a random mode of operation are probably attributable to the characteristics of hydrodynamic resonance which takes place in the thin thermoplastic layer and are responsible for the frost mode of operation. At any rate, it has been found that wherever the spatial spectrum of the input radiation applied to selectively expose the photoconductive layer of the photoreceptor structure 1 crosses a quasi resonance point of the thermoplastic layer, frost deformations will be immediately initiated upon the development thereof, while other portions of the thermoplastic layer will frost subsequently. Furthermore, the frost deformations initiated at such quasi resonance points will exhibit growth rates which are substantially in excess of those which take place at other portions of the surface of the thermoplastic layer. Thus, if the spatial spectrum of the input radiation applied to the thermoplastic layer crosses the quasi resonant frequency thereof and frost deformations are allowed to occur in the random mode, the nonuniform initiation of frost together with the nonuniform growth rates attending the formation of the initial surface perturbations will result in the distortion of the portions of the thermoplastic layer which deform subsequently and hence the distortion of the overall frost image formed. To achieve uniform frost deformation initiation to thereby achieve an undistorted frost image of the light and dark pattern through which selective exposure takes place; it has been conventional to design the thermoplastic layer to have a high resonant frequency $\omega_R$ and to selectively expose the photoreceptor structure upon which the thermoplastic layer resides to activating radiation through a grid or screen whose filament spacing is closely related to the quasi resonant frequency $\omega_R$ of the thermoplastic layer. The former technique constitutes an effort to design a thermoplastic layer whose quasi resonant frequency $\omega_R$ is sufficiently high so that activating radiation may be selected whose spectrum resides below the quasi resonant frequency $\omega_R$ of the thermoplastic layer whereupon nonuniform frost initiation at the quasi resonant frequency $\omega_R$ of the thermoplastic layer may be avoided. This design technique has not proven highly successful as it limits the type of activating radiation which may be used and because the quasi resonant frequency $\omega_R$ of the thermoplastic layer is directly related to the thickness of such layer in a manner such that the thinner the thermoplastic layer, the higher the quasi resonant frequency $\omega_R$ exhibited thereby. However, as there is a lower limit of thickness beyond which viewable frost deformations will not occur, the charge retention characteristics of extremely thin films are not predictable and there are substantial manufacturing difficulties associated with the production of extremely thin thermoplastic layers; the use of thermoplastic films having a high quasi resonant frequency is insufficient, by itself, to solve the problems associated with nonuniform frost initiation. The latter design technique, wherein selective exposure takes place through a screen or grid whose filament spacings are closely related to the quasi resonant frequency $\omega_R$ of the thermoplastic layer, avoids the problem of nonuniform deformation initiation because the activating radiation applied thereto is sinusoidally modulated so that the surface of the thermoplastic layer is forced to deform in a regular sinusoidal manner, the local amplitude of which is exposure related. However, as will be obvious to those of ordinary skill in the art, this latter technique also presents substantial problems in manufacture because it is quite difficult and costly to practically manufacture large area modulating screens or grids exhibiting appropriate surface area coverage for the surface of an actual photoreceptor to be exposed.

Figure 1D:
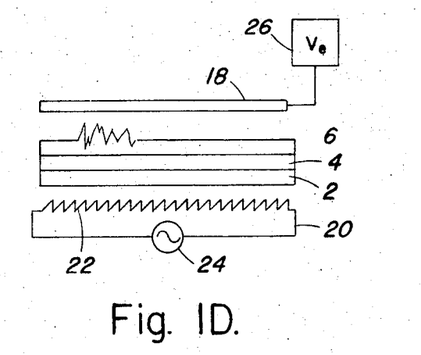

In the embodiment of the present invention set forth in FIGS. 1A–1D, the thickness of the thermoplastic layer 6, as mentioned above, need not be selected with a view primarily to obtaining a quasi resonant frequency $\omega_R$ which is substantially higher than the frequency distribution of the activating radiation received thereby and hence thicker thermoplastic layers which may be conveniently formed and exhibit highly reliable charge retention characteristics may be readily relied upon. Furthermore, the term $\omega_r$ appearing in the expression $\frac{1}{2}(1+\cos \omega_r x)$ need not closely approach, as aforesaid, the quasi resonant frequency $\omega_R$ of the thermoplastic layer 6 because the quasi resonant frequency $\omega_R$ exhibited by such thermoplastic layer 6 may be electrically tuned during the development step to a desired value. This is accomplished, in this embodiment of the present invention is illustrated in FIG. 1D, by carrying out the development of the thermoplastic layer 6 in the presence of a uniform electric field the magnitude of which acts to increase the speed at which development takes place while at the same time decreasing the characteristic size of the surface perturbations which occur and hence the magnitude of such uniform electric field acts to tune the quasi resonant frequency $\omega_R$ exhibited by the thermoplastic layer 6 to a value which approaches a higher value than that indicated by the thickness thereof and/or if desired the frequency $\omega_r$ used for the design of the spatial grating 16 whereupon, in the embodiment of the invention shown in FIGS. 1A–1D, practical screened thermoplastic xerography systems may actually achieve the high resolution, continuous tone frost deformation patterns theoretically predicted but heretofore unrealized in conventional screened thermoplastic techniques.

Returning now to the discussion of the FIGS. 1A–1D and more particularly to FIG. 1D thereof, the last step of this embodiment of the present invention will be described. As shown in FIG. 1D, the last step of the exemplary screened thermoplastic xerography process includes the development of the photoreceptor structure 1 in the presence of a substantially uniform field applied by the electrode means 18. The actual developement of the photoreceptor structure 1 may be accomplished by exposing the thermoplastic layer 6 to heat, solvents or solvent vapors while the photoreceptor structure 1 as a whole is uniformly exposed to activating radiation. In FIG. 1D a developer means 20 has been shown as comprising a heater coil 22 which is adpated to be energized by an A.C. source 24; however, as will be obvious to those of ordinary skill in the art any other suitable energy or fluid applying means may be utilized to develop the thermoplastic layer 6 without any deviation from the teachings of the present invention. The developer means 20 which here takes the form of heater means acts in the well known manner to lower the viscosity of the thermoplastic layer 6 to a liquid state whereat such surface may deform in the frost mode in response to the charge pattern present thereon. As the thickness of the thermoplastic layer 6 is sufficiently thin so that hydrodynamic resonance plays a key role in the deformation thereof, the surface of the thermoplastic layer 6 will deform in the frost mode in accordance with the density of charge pattern present. In FIG. 1D, as a substantial charge density resides at the portion of the surface of the thermoplastic layer 6 overlying the portion of the photoconductive layer 4 which received activating radiation during the selective, optically screened exposure step shown in FIG. 1B, this portion of the surface of the thermoplastic layer 6 has been illustrated as greatly deformed while the remaining portions of the surface of the thermoplastic layer 6, which frost to a much lesser degree, have been illustrated as substantantially smooth. When the desired frost density is obtained, the surface of the thermoplastic layer 6 may be allowed to harden normally or the viscosity of such thermoplastic layer 6 may be rapidly raised to abruptly stop the frost mechanism. In FIG. 1D, no means for uniformly exposing the photoreceptor structure 1 to activating radiation has been illustrated but it will be appreciated that an ambient radiation level may be utilized or alternatively a source 12 such as that relied upon in FIG. 1B may be utilized. The development of the photoreceptor structure 1 while uniformly exposing it to activating radiation is optional but preferred because such uniform exposure serves to render the entire photoconductive layer 4 conductive so that the lower surface of the thermoplastic layer 6 is referenced to ground or the reference potential of the conductor in contact with the lower surface of the photoconductive layer 4 whereby any adverse effects to image formation at this stage of the exemplary screened thermoplastic xerography technique, due to the lateral conductivity exhibited by such photoconductive layer 4, are substantially avoided.

The development of the photoreceptor structure 1 shown in FIG. 1D is carried out according to the teachings of the present invention in the presence of an electric field which in the case of the exemplary embodiment shown in FIGS. 1A–1D is substantially uniform in nature and established between an external developement electrode and the conductive plane of the substrate 2; however, as shall be obvious from subsequent embodiments of the present invention, other field distributions may be relied upon depending upon the results sought to be achieved. The development of the photoreceptor structure in a uniform field is illustrated in FIG. 1D as being accomplished by the electrode means 18 which is connected to a suitable high voltage source 26. The electrode means 18 may comprise, as shown in FIG. 1D, a solid conductive member which overlies the entire surface of the thermoplastic layer 6. As is well known to those of ordinary skill in the art, for a truly uniform field to be applied to the surface of the thermoplastic layer 6, the surface area of the electrode means 18 overlying the thermoplastic layer 6 should substantially exceed the surface area of such thermoplastic layer 6. However, if the position of the electrode 18 is relatively close to the surface of the thermoplastic layer 6, a truly uniform field will not be needed and it is generally sufficient if the surface area of the electrode means 18 corresponds to the surface area of the thermoplastic layer 6. The electrode means 18 is shown in FIG. 1D in a preferred position proximate to the surface of the thermoplastic layer 6; however, as will be obvious to those of ordinary skill in the art, the electrode means 18 may be placed on either the thermoplastic layer 6 or the substrate 2 side of the photoreceptor structure 1. The polarity of the potential applied to electrode means 18 positioned above the thermoplastic layer 6 in the manner shown in FIG. 1D should be the same as that of the charges applied to the surface of the thermoplastic layer 6 during the uniform charging step illustrated in FIG. 1A and hence in the case illustrated should be positive. The magnitude of the voltage applied by source 26 to the electrode means 18 should be appropriate for raising the quasi resonant frequency exhibited by the thermoplastic layer 6 to the value desired which would ordinarily constitute the difference between the quasi resonant frequency $\omega_R$ of the thermoplastic layer 6 and the $\omega_r$ exhibited by the spatial grating 16. Although the electrode means 18 may be energized only during the actual development step to which the photoreceptor structure 1 is subjected, it should be noted that the uniform field applied thereby to the surface of the thermoplastic layer 6 does not play a role in the actual development thereof but merely tunes the quasi resonant frequency $\omega_R$ exhibited by the thermoplastic layer 6 to a desired value. This may be appreciated by the realization that in terms of frost deformation, the average wavelength or characteristic size of the individual surface perturbations generally correspond to the quasi resonance points of the thermoplastic layer. Accordingly, as the position of such quasi resonance points will be varied by the effects of the uniform field on the electro-hydrodynamic resonance which takes place in a thin thermoplastic layer, upon the development thereof; the application of a uniform field thereto, during development, effectively achieves a corresponding variance in the surface perturbations produced and hence in the quasi resonant frequency $\omega_R$ exhibited by the thermoplastic layer.

The frost image formed on the surface of the thermoplastic layer 6 upon the completion of the foregoing development step will represent, in the usual manner, a permanent visible image of the data indicia present on the light and dark pattern 14 which may be retained for subsequent use, read directly or indirectly by well known optical projection techniques and/or thereafter erased, in the well known manner, by a second application of heat, solvents or solvent vapors thereto. Therefore, it will be seen that the instant embodiment of the present invention allows a periodic frost deformation pattern to be established on the surface of the thermoplastic layer 6 which exhibits high resolution and continuous tone properties while allowing a thicker layer of thermoplastic material to be relied upon than would otherwise be optimum because the quasi resonant frequency of such thermoplastic layer may be tuned to a desired value during the development thereof. Additionally the embodiment of this invention illustrated in FIGS. 1A–1D is advantageous because the operating voltages across the thermoplastic layer 6 may be reduced to thereby reduce noise effects in the photoconductive layer and such thermoplastic layer 6 may be adjusted for aging characteristics exhibited by modifying the intensity of the applied, uniform field.

FIGS. 2A–2D show another exemplary embodiment of the present invention wherein a photoreceptor structure including a thermoplastic layer is forced to deform in a regular periodic manner upon the development thereof. The embodiment of this invention illustrated in FIGS. 2A–2D may, under certain circumstances, be considered preferable to that shown in FIGS. 1A–1D because in addition to manifesting the capability to tune the quasi resonant frequency $\omega_R$ of the thermoplastic layer to a desired value, this embodiment of the invention, as will be seen below, forces the thermoplastic layer to deform in an organized mode which is everywhere periodic without requiring an optical screening of the activating radiation received thereby. In the embodiment of this invention illustrated in FIGS. 2A–2D, much of the structure illustrated takes the same form, is formed in the same manner, performs the same function and admits of same variations as corresponding structure illustrated in FIGS. 1A–1D and described in detail above. Accordingly, in FIGS. 2A–2D, structure which is common to that previously described in conjunction with FIGS. 1A–1D has received primed reference numerals which correspond to the reference numerals utilized for such common structure in FIGS. 1A–1D and the description of such common structure will be made by reference to the description of corresponding structure in FIGS. 1A–1D so that undue reiteration is avoided.

As shown in FIGS. 2A–2D, the second embodiment of the present invention employs a photoreceptor structure 1' comprising a substrate 2', a photoconductive layer 4' and a thermoplastic layer 6'. The photoreceptor structure 1' and each of the layers 2', 4' and 6' illustrated therein may take precisely the same form, perform the same function and admit of the same variations as the photoreceptor structure 1 described above in conjunction with FIGS. 1A–1D. Accordingly, the description of the photoreceptor structure 1' will not be repeated here except to note that the thickness of the thermoplastic layer 6', as was the case in regard to the thermoplastic layer 6, described above, need not be selected to exhibit a quasi resonant frequency $\omega_R$ which is higher than the spatial spectrum of the activating radiation to be received thereby because the quasi resonant frequency $\omega_R$ manifested by the thermoplastic layer 6', as will be seen below, may be made to approach a higher, desired value during the development of the photoreceptor 1'. Therefore, although the thickness of the thermoplastic layer 6' should be such that it exhibits a relatively high quasi resonant frequency and hydrodynamic resonance plays a key role in the frost mode deformation thereof, the thickness selected for the thermoplastic layer 6' should be sufficient so that the thermoplastic layer 6' exhibits good charge retention characteristics, may be conveniently formed and does not closely approach the lower limit at which a viewable frost deformation pattern will occur.

Figure 2A:
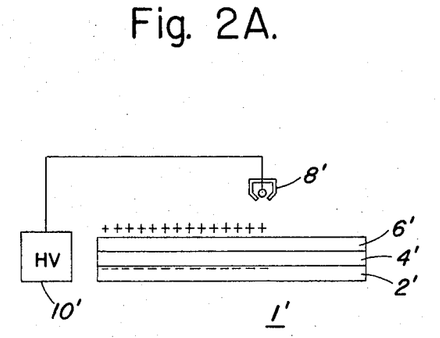
FIGS. 2A–2D show another exemplary embodiment of the present invention wherein a photoreceptor structure including a thermoplastic layer is forced to deform in a regular periodic manner upon the development thereof.

The photoreceptor structure 1' may have a viewable frost deformation pattern formed on the surface of the thermoplastic layer 6' by the exemplary thermoplastic xerography technique illustrated in FIGS. 2A–2D; however, as shall be obvious to those of ordinary skill in the art as this description continues, other thermoplastic xerography techniques employing the features of this embodiment of the present invention may be readily utilized. It should be noted at the outset that the exemplary thermoplastic xerography techniques illustrated in FIGS. 2A–2D, differs from that shown in FIGS. 1A–1D primarily in that the selective exposure step depicted in FIG. 2B does not include an optical screening of the activating radiation applied to the surface of the photoreceptor structure 1' and that the development step shown in FIG. 2D takes place in the presence of a nonuniform field applied by a slotted electrode 30. The initial step of the exemplary thermoplastic xerography technique illustrated in FIGS. 2A–2D is shown in FIG. 2A and comprises the step of applying a uniform charge to the surface of the thermoplastic layer 6' so that the upper surface of the photoreceptor structure is charged to a common potential. This may be accomplished in the same manner as described above for the uniform charging step depicted in FIG. 1A wherein corona charging techniques are employed and a specialized electrode means 8 of a corona charging device is passed over the surface of the thermoplastic layer 6 one or more times. Accordingly, in FIG. 2A a specialized electrode means 8' of a corona discharge device is illustrated as traversing the surface of the thermoplastic layer 6' and it will be appreciated that the specialized electrode means 8' and the source of high potential 10' may take the same form and perform the same function as the structure corresponding thereto described above in conjunction with FIG. 1A. Therefore it will be manifest that a uniform potential will be established on the surface of the thermoplastic layer 6' during the initial step of the exemplary thermoplastic xerography technique depicted in FIGS. 2A–2D by the application of a uniform charge, which may be either positive or negative as aforesaid, to the surface of the thermoplastic layer 6'. As the uniform charge pattern formed on the surface of the thermoplastic layer 6' has been indicated in FIG. 2A as formed of positive charges and the photoconductive layer 4' has been retained in its insulating condition, opposite polarity charges will be induced, in the manner described above, at the underside of the photoconductive layer 4'. Accordingly, the charge pattern associated with the photoreceptor structure 1' at the termination of the uniform charging step depicted in FIG. 2A will exhibit a uniform potential and take on the characteristics portrayed by the positive (+) and negative (—) charge indicia shown therein.

Figure 2B:
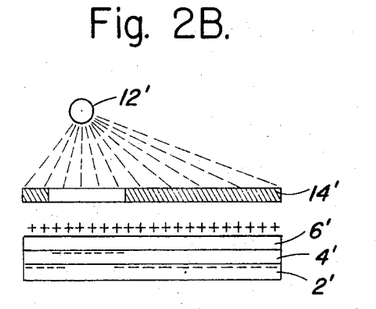

Upon the competion of the initial charging operation depicted in FIG. 2A, the second step of the instant thermoplastic xerography technique may be performed in the manner shown in FIG. 2B. The second step of exemplary thermoplastic xerography technique presently under consideration comprises the selective exposure of the photoreceptor structure 1' to activating radiation so that the photoconductive layer 4' is rendered selectively conductive. This is here accomplished in the same manner as was described above in connection with FIG. 1B, except in the instant case the activating radiation selectively applied to the photoceptor structure 1' is not optically screened and hence no spatial grating is optically interposed in the radiation path which resides between the source 12' of activating radiation and the surface of the thermoplastic layer 6'. Therefore, in the selective exposure step of the instant embodiment shown in FIG. 2A, activating radiation from a source 12' is imaged upon the upper surface of the thermoplastic layer 6' through a light and dark pattern 14' representing the object to be reproduced. As the thermoplastic layer 6' is transmissive to radiation impingent thereon, activating radiation which is selectively passed by the light and dark pattern 14' will propagate through the thermoplastic layer 6' and be received at discrete portions of the photoconductive layer 4' which spatically correspond to the light portions of such light and dark pattern 14'. Therefore, in the well known manner, such corresponding portions of the photoconductive layer 4' will be selectively rendered conductive by the activating radiation received thereby so that the charge pattern residing at the interface between the photoconductive layer 4' and the conductive material will be altered in the manner shown in FIG. 1B wherein the charges residing at such discrete, activated portions of the photoconductive layer 4' will propagate therethrough to the lower surface of the thermoplastic layer 6' which is insulating in nature. The uniform charge pattern on the surface of the thermoplastic layer 6' is thereby selectively dissipated to the extent that the surface of the photoreceptor structure no longer exhibits the same potential at the surface portions thereof overlying the activated portions of the photoconductive layer 4' as it does at the portions thereof which do not overlie the discrete portions of the photoconductive layer which have been activated. Thus in the second step of the exemplary thermoplastic xerography technique presently under discussion, the charge pattern illustrated in FIG. 2B is established due to the selective exposure of the photoreceptor structure 1' to activating radiation from the source 12'. It should be noted however, that as the activating radiation selectively applied to the photoreceptor structure 1' has not been optically screened, as was done in FIG. 1B, the charge pattern established on the portions of the thermoplastic layer 6' which overlie the discrete portions of the photoconductive layer 4' which were selectively rendered conductive do not exhibit a predetermined periodicity. Accordingly, as the requisite portions of the established charge pattern do not exhibit a predetermined periodicity and the thermoplastic layer 6' has not been structurally predisposed to deform in a regular periodic manner, the conditions thus far established are those requisite for a random frost deformation mechanism to operate upon the development of the photoreceptor structure 1'. In FIG. 2B, the source 12' of activating radiation and the light and dark pattern 14' illustrated for the purposes of carrying out the foregoing selective exposure step, may take exactly the same form and admit of the same variations as their counterparts described in conjunction with FIG. 1B.

Figure 2C:
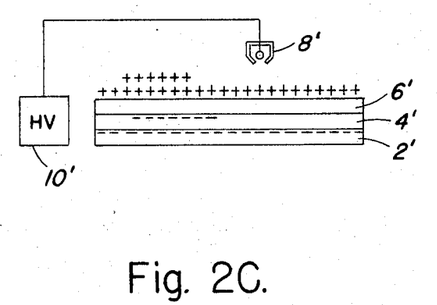

The initial step of the exemplary thermoplastic xerography technique illustrated in FIGS. 2A–2D comprises a second charging step, which is again optional, wherein the surface of the photoreceptor structure 1' is again charged to a constant potential with respect to ground or the reference potential associated with the conductive material in contact with the lower surface of the photoconductive layer 4'. This second charging step may be carried out in precisely the same manner discussed in conjunction with FIG. 1C whereupon only the surface portions of the thermoplastic layer 6' which overlie selectively exposed portions of the photoconductive layer 4' will receive additional charge as the remaining surface portions of the thermoplastic layer 6' have been retained at the uniform potential which the specialized electrode means 8' seeks to impose. Accordingly, as indicated by FIG. 2C, the second charging step establishes each surface portion of the thermoplastic layer 6' at a uniform potential; however, the charge density of the surface of the thermoplastic layer 6' will now vary in accordance with the light and dark pattern 14' through which the photoreceptor structure 1' was selectively exposed.

Figure 2D:
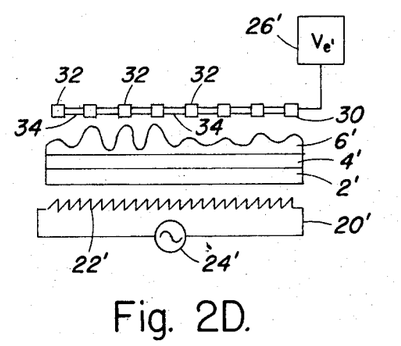

The development step of the exemplary thermoplastic xerography technique depicted in FIGS. 2A–2D is illustrated in FIG. 2D. The actual development of the photoreceptor structure 1', wherein the photoreceptor structure 1' is uniformly exposed in an optional manner and the viscosity of the thermoplastic layer 6' is lowered by the application of heat, solvents or solvent vapors thereto so that said thermoplastic layer 6' deforms in the frost mode in response to the charge pattern thereon, should here be considered to take place in the same manner as was discussed in conjunction with FIG. 1D. Therefore, in FIG. 2D, the developer means 20' which comprises heater coil 22' and A.C. source 24' has been illustrated and it should be clearly understood that such developer means 20' or any of the alternatives suggested above therefor will function, in a preferred embodiment, with the uniform exposure of the photoreceptor structure 1' to lower the viscosity of the thermoplastic layer 6' and reference the lower surface thereof to ground or another reference potential so that the surface of said thermoplastic layer 4' will deform in the frost mode until the desired frost density is achieved. Thereafter, the developer means 20' may be de-energized and the surface of the thermoplastic layer 6' may be allowed to harden normally or the viscosity of such thermoplastic layer 6' may be rapidly raised to abruptly stop the frost mechanism. However, in the exemplary thermoplastic xerography technique considered in FIGS. 2A–2D, the thickness of thermoplastic layer 6' of the photoreceptor structure 1' was not purposely selected to exhibit a quasi resonant frequency $\omega_R$ which would be higher than the spectrum of the activating radiation applied thereto by the source 12' in the selective exposure step illustrated in FIG. 2B and such activating radiation was not optically screened by a spatial grating to insure that the charge pattern formed on the surface of the thermoplastic layer 6' would exhibit a predetermined periodicity which would force the surface of such thermoplastic layer 4', upon the development thereof, to deform in a regular periodic manner. Thus, if the photoreceptor structure 1', having the charge pattern illustrated in FIG. 2C present thereon, was merely developed in the manner stated above, the frost deformation pattern formed would in the usual case be noisy and not truly representative of the information sought to be stored due to the difficulties associated with nonuniform frost initiation as aforesaid.

The problems associated with nonuniform frost initiation are overcome in the embodiment of the invention depicted in FIGS. 2A–2D by carrying out the foregoing development of the surface of the thermoplastic layer 6' in the presence of a periodically varying electric field. This is accomplished as shown in FIG. 2D by electrode means 30 which is energized by a high voltage source 26' during at least the development step depicted in FIG. 2D. The electrode means 30, as illustrated in FIG. 2D, takes the form of a slotted electrode structure having individual electrode members 32 extending across the surface of the thermoplastic layer 6'. The end portions of each of the individual electrode members 32 are interconnected by bridging means 34 so that a mechanically rigid structure is formed. As shown in FIG. 2D, conductor means connected to one terminal of the high voltage source 26' may be connected through the bridging means 34 to each of the individual electrode members 32 present in the electrode means 30. Although a specific structural configuration has been depicted in FIG. 2D for the electrode means 30, it should be clearly understood that any electrode means having a periodic configuration may be readily substituted for the illustrated electrode means 30 described above. The electrode means 30, as shown in FIG. 2D should be positioned in a plane which is substantially parallel to and overlies the surface of the thermoplastic layer 4' of the photoreceptor structure 1'. Additionally, the area occupied by the electrode means 30 should preferably be similar to the surface area of the thermoplastic layer 6' and the electrode means 30 should be positioned in a relatively close relationship therewith; however, as will be apparent to those of ordinary skill in the art, wide deviations in the area of the electrode means 30 are available and the position of the electrode means 30 will greatly depend upon the magnitude of the potential applied by the high voltage source 26' and the magnitude of the field which is desired at the surface of the thermoplastic layer 6'. The high voltage source 26' may take precisely the same form as the high voltage source 26 described above in conjunction with FIG. 1D and may here be considered to apply a positive polarity voltage to the electrode means 30.

As will be appreciated by those of ordinary skill in the art, the field generated by the electrode means 30 due to the slotted structure thereof, as viewed from the surface of the thermoplastic layer 4' will take the form of a periodically varying field having a uniform component. Accordingly, such periodically varying field may be likened to a periodic waveform residing on a D.C. level and analyzed with a view toward its effects on the frost mode development of the surface of the thermoplastic layer 6' in terms of its uniform component and its periodically varying component. The uniform component, whose magnitude could theoretically be measured in space at a point on the thermoplastic layer 6' intermediate two electrode members 32 of the electrode means 30, performs the same function as was described for the uniform field employed in conjunction with the initial embodiment of this invention depicted in FIGS. 1A–1D. Thus, the uniform component of the electric field applied by the electrode means 30 acts in the previously described manner to increase the value of the quasi resonant frequency $\omega_R$ exhibited by the thermoplastic layer 6' from that which would normally obtain in a thermoplastic layer 6' having the thickness utilized herein to a higher desired value which may be made to approach an optimized condition. The periodically varying component of the electric field applied to the surface of the thermoplastic layer 6' by the electrode means 30 will have a periodicity related to the periodicity of the electrode members 32 in the electrode means 30 and may be considered to vary between a lower limit, as measured at points on the thermoplastic layer 6' whereat only the uniform electric field component resides, and an upper limit whereat maximum field intensity obtains, as measured at the points on the thermoplastic layer 6' which are directly below the center of an electrode member 32 of the electrode means 30. The effect of the periodically varying component of the electric field applied to the surface of the thermoplastic layer 6' by the electrode means 30, during the development of such thermoplastic layer 6', is to cause the frost mode surface perturbations of the deforming thermoplastic layer 6' to be organized and align themselves so that the generators of the deformed surface of the thermoplastic layer 6' are parallel to the generators of the slotted structure of the electrode means 30. Thus, the uniform component of the electric field applied by the electrode means 30 tunes the quasi resonant frequency $\omega_R$ exhibited by the thermoplastic layer 6', during the development thereof, to a desired value which is substantially higher than that indicated by the thickness of the thermoplastic layer 6' while the periodically varying component of the electric field applied by the electrode means 30 to the thermoplastic layer 6' will cause the surface of the thermoplastic layer 6' to deform, upon the development thereof, in an organized frost mode which is everywhere periodic.

The manner in which the surface of the thermoplastic layer 6' will deform in an organized frost mode upon the development thereof in the presence of a periodically varying electric field such as is applied in the instant embodiment of the present invention is indicated by the deformed surface of the thermoplastic layer 6' illustrated in FIG. 2D. As may be seen by an inspection of the frost deformation pattern illustrated in FIG. 2D, where the density of the charge pattern formed on the surface of the thermoplastic layer 6' was substantial, large surface perturbations in the nature of frost arise while the remaining portions of the surface of the thermoplastic layer 6' deform to a much lesser degree as was the case for the frost deformation patterns obtained according to the screened thermoplastic xerography techniques of the present invention as described above in conjunction with FIGS. 1A–1D. However, in contradistinction to the frost deformation pattern shown in FIG. 1D, the frost deformation pattern obtained with the exemplary embodiment of the invention described in conjunction with FIGS. 2A–2D, as shown in FIG. 2D, is everywhere periodic regardless of the magnitude of the charge density present thereon. This constitutes an important advantage of the instant embodiment of the present invention, because as the organized frost deformation pattern is everywhere periodic it comprises an entirely modulated deformation pattern which may be demodulated when read out so that spurious noise may be avoided and only the information component thereof obtained. The advantageous nature of a frost deformation pattern which is everywhere periodic may be appreciated by a comparison thereof with a frost deformation pattern formed by optical screening techniques such as shown in FIG. 1D. In FIG. 1D, only the portion of the thermoplastic layer 6 overlying the portion of the photoconductive layer 4 which received optically screened activating radiation is periodic and hence the remaining portions of such thermoplastic layer 6 frost in an unmodulated, nonperiodic manner which must manifest themselves as noise since they can not be demodulated upon the readout of the thermoplastic layer 6. Additionally, in this embodiment of the present invention, no spatial grating is required.

The organized frost deformation pattern formed on the surface of the thermoplastic layer 6' according to the embodiment of this invention illustrated in FIGS. 2A–2D may be read directly due to the radiation scattering properties thereof or read indirectly by well known optical transmission or refraction techniques such as those utilized in Schlieren projectors. Thereafter, the photoreceptor structure 1' may be stored for subsequent use or erased by a second application of heat, solvents or solvent vapors thereto so that other organized frost deformation patterns may be formed thereon. It is noted that in the instant embodiment of the present invention, optimum development speed for the thermoplastic layer 6' may be achieved if the periodicity $\omega_r$ of the electrode members 32 of the electrode means 30 is made the same as the periodicity of the quasi resonant frequency $\omega_R$ which the thermoplastic layer 6' is forced to exhibit by the uniform component of the electric field applied during the development step.

Figure 3:
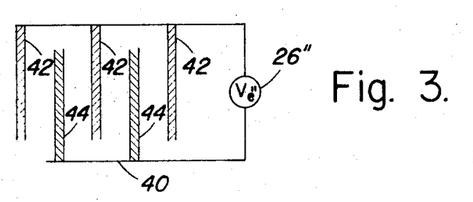
FIG. 3 illustrates an alternative embodiment of electrode structure in accordance with the present invention suitable for use in conjunction with the exemplary embodiment of this invention shown in FIGS. 2A–2D.

FIG. 3 illustrates an alternative embodiment of electrode structure in accordance with the present invention suitable for use in conjunction with the exemplary embodiment of this invention shown in FIGS. 2A–2D. The electrode structure 40 depicted in FIG. 3 is adapted to produce a periodically varying electrical field of the nature described above in conjunction with FIG. 2D; however, no uniform component is associated with the periodically varying field produced by the electrode structure 40. Accordingly, the electrode structure 40 may be substituted for the electrode means 30 shown in FIG. 2D whenever it is desired to force the thermoplastic layer 6' to deform in an organized frost mode, so that the frost deformation pattern formed is everywhere periodic, but it is not desired to tune the quasi resonant frequency $\omega_R$ of the thermoplastic layer 6' to a desired value. As shown in FIG. 3, the electrode structure 40 comprises first and second groups of electrode members 42 and 44 arranged in a periodic, interleaved manner. Each of the electrode members 42 in the first group is connected through the conductor illustrated to a positive polarity output of a high voltage source 26" while each of the electrode members 44 present in the second group is connected to a negative polarity output of the high voltage source 26" through the conductor shown in FIG. 3. The conductors shown in FIG. 3 may also serve in roles of support means so that a rigid mechanical structure is formed or alternatively other support means (not shown) may be relied upon. The high voltage source 26" may take substantially the same form as that described above in connection with high voltage sources 26 and 26'.

In operation, it will be appreciated that as alternate electrode members 42 and 44 are maintained at potential levels which are equal in magnitude but opposite in polarity, a periodically varying electric field will be established in the vicinity of the surface of the thermoplastic layer 6' which has no effective uniform component associated therewith. Accordingly, it will be appreciated that the electric field produced by the electrode structure 40 as viewed from the surface of the thermoplastic layer 6' will comprise only a periodically varying component and hence the application of this field to the surface of the thermoplastic layer 6' during the development thereof will cause such thermoplastic layer 6' to deform in the organized frost mode.

Although the present invention has been disclosed in conjunction with several exemplary embodiments thereof, many modifications and variations of the specific structure and thermoplastic xerography techniques set forth herein will be apparent to those of ordinary skill in the art. For instance, in the embodiments of this invention where specific electrode structure is taught, it will be apparent that any electrode structure capable of generating a field having the desired distribution may be used. Furthermore, any known thermoplastic xerography technique wherein a frost deformation pattern is realized may be utilized in accordance with the teachings of the instant invention so long as the photoreceptor is developed in the presence of an electric field having the desired characteristics or the equivalents thereof. In addition, although photoreceptor structure has been set forth herein wherein the deforming surface of the thermoplastic layer has been shown as an external surface of the photoreceptor structure, it will be understood that photoreceptor structure wherein the deforming surface of the thermoplastic layer comprises an internal surface of such photoreceptor structure may also be used in accordance with the teachings of the present invention and hence the term surface should be construed to contemplate both internal and external surfaces of the various layers present in known photoreceptor structure.

While the invention has been described in connection with a plurality of specific embodiments thereof, it will be understood that many modifications will be readily apparent to those of ordinary skill in the art; and that this invention is intended to cover any adaptations or variations thereof. Therefore, it is manifestly intended that this invention be only limited by the claims and the equivalents thereof.

What is claimed is:

1. A method of thermoplastic xerography wherein a frost deformation pattern is established on the surface of a thermoplastic layer, comprising the steps of:
    charging a thermoplastic surface of a photoreceptor structure which includes at least a photoconductive layer and said thermoplastic layer;
    selectively exposing said photoreceptor structure to radiation representative of the image to be formed;
    electrically tuning said thermoplastic layer to exhibit a quasi-resonant frequency other than that intrinsically associated with the physical characteristics of said thermoplastic layer by subjecting said thermoplastic layer to an electric field manifesting at least a uniform electric field component; and
    developing said photoreceptor structure while said electric field is applied to said thermoplastic layer by softening said thermoplastic layer to cause said thermoplastic layer to deform in the frost mode and thereby form a frost deformation pattern.

2. The method of thermoplastic xerography according to claim 1 wherein the electric field applied during said development step additionally includes a periodically varying field component having a field strength that alternately and periodically varies from a maximum value to a minimum value across said thermoplastic surface which causes said thermoplastic layer to deform in an organized manner which is everywhere periodic.

3. The method of thermoplastic xerography according to claim 2 wherein said electric field is applied by electrode means having a periodic structure.

4. The method of thermoplastic xerography according to claim 3 additionally comprising the step of recharging the surface of said thermoplastic layer to a constant potential after the selective exposure of said photoreceptor structure and prior to the development thereof.

5. The method of thermoplastic xerography according to claim 4 wherein the step of developing additionally comprises uniformly exposing said photoreceptor structure to radiation.

6. The method of thermoplastic xerography according to claim 1 wherein said electric field applied during said developing step is essentially a uniform field with respect to said thermoplastic surface of said photoreceptor structure and acts to tune said thermoplastic layer during the development thereof.

7. The method of thermoplastic xerography according to claim 1 wherein said electric field is applied by electrode means having a substantially continuous field generating surface.

8. The method of thermoplastic xerography according to claim 7 wherein the step of selectively exposing said photoreceptor structure to image radiation of the image to be formed includes optically screening such image radiation with spatial grating means having a predetermined periodicity.

9. The method of thermoplastic xerography according to claim 8 additionally comprising the step of recharging the surface of said thermoplastic layer to a constant potential after the selective exposure of said photoreceptor structure and prior to the development thereof.

10. The method of thermoplastic xerography according to claim 9 wherein the step of developing additionally comprises uniformly exposing said photoreceptor structure to radiation.

11. A method of thermoplastic xerography wherein a periodic frost deformation pattern is established on the surface of a thermoplastic layer, comprising the steps of:
charging a thermoplastic surface of a photoreceptor structure which includes at least a photoconductive layer and said thermoplastic layer;
selectively exposing said photoreceptor structure to image radiation representative of the image to be formed; and
causing said thermoplastic surface to deform in an organized frost mode to form a frost deformation pattern which is everywhere periodic by developing said photoreceptor structure in the presence of an electric field having at least a periodically varying electric field component, said periodically varying electric field component exhibiting a field strength that alternately and periodically varies from a maximum value to a minimum value across said thermoplastic surfaces.

12. The method of thermoplastic xerography according to claim 11 wherein said electric field is applied by electrode means having interleaved electrode members arranged in a periodic manner, said periodically varying electric field component displaying a variation such that the average constant field strength along said axis is essentially equal to zero.

13. The method of thermoplastic xerography according to claim 12 additionally comprising the step of recharging the surface of said thermoplastic layer to a constant potential after the selective exposure of said photoreceptor structure and prior to the development thereof.

14. The method of thermoplastic xerography according to claim 13 wherein the step of developing said photoreceptor structure additionally comprises the step of uniformly exposing said photoreceptor structure to radiation.

15. The method of thermoplastic xerography according to claim 11 wherein the electric field applied during development additionally includes a uniform field component exhibiting essentially a constant field strength.

16. The method of thermoplastic xerography according to claim 15 wherein said electric field is applied by electrode means having a periodic structure.

17. The method of thermoplastic xerography according to claim 16 additionally comprising the step of recharging the surface of said thermoplastic layer to a constant potential after the selective exposure of said photoreceptor structure and prior to the development thereof.

18. The method of thermoplastic xerography according to claim 17 wherein the step of developing said photoreceptor structure additionally comprises the step of uniformly exposing said photoreceptor structure to radiation.

19. A method of developing a thermoplastic surface of a photoreceptor to form a frost deformation pattern on said thermoplastic surface, said photoreceptor including at least a thermoplastic layer and a photoconductive layer and wherein said thermoplastic surface has been charged and selectively exposed to image radiation representative of the image to be formed, said method of developing comprising the steps of:
softening said thermoplastic layer and allowing said thermoplastic layer to deform; and
electrically tuning said thermoplastic layer to exhibit a quasi-resonant frequency other than that intrinsically associated with the physical characteristics thereof by subjecting said thermoplastic layer to an electric field manifesting at least a uniform electric field component while said thermoplastic layer is in a softened condition and during the deformation thereof to cause said thermoplastic surface to deform in a frost mode whereby a frost deformation pattern is formed thereon.

20. The method of developing according to claim 19 wherein said electric field is applied by electrode means having a substantially continuous field generating surface.

21. The method of developing according to claim 19 wherein the step of electrically tuning is carried out by applying a periodically varying electric field which additionally causes said thermoplastic layer to frost in an organized manner which is everywhere periodic, said periodically varying electric field exhibiting a field strength that alternately and periodically varies from a maximum value to a minimum value across the surface of said thermoplastic layer.

22. The method of developing according to claim 21 wherein said electric field is applied by electrode means having a periodic structure.

23. A method of developing a thermoplastic surface of a photoreceptor to form a frost deformation pattern on said thermoplastic surface, said photoreceptor including at least a thermoplastic layer and a photoconductive layer and wherein said thermoplastic surface has been charged and selectively exposed to image radiation representative of the image to be formed, said method of developing comprising the steps of:
softening said thermoplastic layer and allowing said thermoplastic layer to deform; and
causing said thermoplastic surface to deform in an organized frost mode to form a frost deformation pattern which is everywhere periodic by applying an electric field having at least a periodically varying electric field component thereto while said thermoplastic surface is in a softened condition and during the deformation thereof to force said thermoplastic surface to deform in an organized frost mode to form a frost deformation pattern which is everywhere periodic, said periodically varying electric field component exhibiting a field strength that alternately and periodically varies from a maximum value to a minimum value across said thermoplastic surface.

24. The method of developing according to claim 23 wherein the step of causing said thermoplastic layer to deform in an organized frost mode is carried out by applying said electric field with electrode means having interleaved electrode members arranged in a periodic manner, said periodically varying electric field component developing a variation such that the average constant field strength across said surface is essentially equal to zero.

25. The method of developing according to claim 23 wherein the step of causing said thermoplastic layer to deform in an organized frost mode is carried out by applying an electric field which additionally includes a uniform field component exhibiting essentially constant field strength whereby said thermoplastic layer is electrically tuned to exhibit a quasi-resonant frequency other than that intrinsically associated with the physical characteristics of said thermoplastic layer.

References Cited

UNITED STATES PATENTS

| | | | |
|---|---|---|---|
| 3,238,041 | 3/1966 | Corrsin | 96—1.1 |
| 3,560,206 | 2/1971 | Juirblis | 96—1.1 |
| 3,583,868 | 6/1971 | Noble et al. | 96—1.1 X |
| 3,196,008 | 7/1965 | Mihajlov et al. | 96—1.1 |
| 3,131,019 | 4/1964 | D'Antonio | 96—1.1 X |
| 3,333,958 | 8/1967 | Giaimo | 96—1.1 |
| 3,322,538 | 5/1967 | Redington | 96—1.1 |
| 3,137,762 | 6/1964 | Baumgartner et al. | 96—1.1 X |
| 3,482,969 | 12/1969 | Ewing | 96—1.1 |
| 3,196,010 | 7/1965 | Goffe et al. | 96—1.1 |
| 3,214,272 | 10/1965 | Ploke | 96—1.1 |
| 3,239,840 | 3/1966 | Chafanis | 346—74 TP |
| 3,284,196 | 11/1966 | Mazza | 96—1.1 |

OTHER REFERENCES

Urbach: The Role of Screening in Thermoplastic Xerography, Photographic Science & Eng., vol. 10, No. 5, pp. 287–297 (1966).

CHARLES E. VAN HORN, Primary Examiner

U.S. Cl. X.R.

178—6.6 TP; 340—173 TP; 346—74 TP; 355—9